United States Patent
Bastide et al.

(10) Patent No.: US 10,140,363 B2
(45) Date of Patent: Nov. 27, 2018

(54) SOCIAL NETWORK CROWD TRANSLATION

(71) Applicant: International Business Machines Corporation, Armonk, NY (US)

(72) Inventors: Paul Bastide, Boxford, MA (US); Lisa Seacat DeLuca, San Francisco, CA (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/718,153

(22) Filed: May 21, 2015

(65) Prior Publication Data
US 2016/0342587 A1 Nov. 24, 2016

(51) Int. Cl.
*G06F 17/30* (2006.01)
*G06F 17/28* (2006.01)
*G06Q 50/00* (2012.01)

(52) U.S. Cl.
CPC .... *G06F 17/30702* (2013.01); *G06F 17/2836* (2013.01); *G06Q 50/01* (2013.01)

(58) Field of Classification Search
CPC ............. G06F 17/289; G06F 17/30702; G06F 17/2836; G06Q 50/01
USPC ........................................................... 704/2
See application file for complete search history.

(56) References Cited

U.S. PATENT DOCUMENTS

| | | | |
|---|---|---|---|
| 6,598,015 B1 | 7/2003 | Peterson et al. | |
| 7,536,294 B1* | 5/2009 | Stanz | G06F 9/454 704/3 |
| 8,996,352 B2* | 3/2015 | Orsini | G06F 17/2854 434/157 |
| 2014/0278342 A1* | 9/2014 | Shoshan | G06F 17/289 704/2 |

* cited by examiner

*Primary Examiner* — Bharatkumar S Shah
(74) *Attorney, Agent, or Firm* — Steven M. Greenberg, Esq.; Shutts & Bowen LLP

(57) ABSTRACT

Embodiments of the invention provide for social network crowd translation. A method for social network crowd translation includes selecting a source document to be translated into a specific target language from a source language and parsing the document to determine a context for the source document. The method also includes querying a social network for different individuals with profile data indicating proficiency with the target language and including keywords mapping to the context of the document. Thereafter, in response to locating an individual in the social network having profile data which indicates proficiency with the target language and including keywords mapping to the context of the document, the located individual is notified of a request to translate the document.

15 Claims, 2 Drawing Sheets

SOCIAL NETWORK CROWD TRANSLATION

BACKGROUND OF THE INVENTION

Field of the Invention

The present invention relates to the translation of computer generated text and more particularly to the crowd-sourced translation of textual content in a network distributable file.

Description of the Related Art

The process of translating a source document from one language to another historically required a speaker of both the source language of the document and a target language of the document in order to manually create a translated document incorporating the translated content of the source document. Prior to the advent of the Internet, the task of translating documentation and source code for a computer program from one language to another in support of an internationalization effort similarly required the manual exercise of a speaker of both source and target languages performing a manual translation. However, with the advent of the Internet, and the resulting explosion of global users seeking access to computer distributable text, the manual process of translation rapidly became unworkable.

To supplant the manual process of translating computer distributable text from one language to another, several different automated processes had been developed. A most common process is that of machine translation. In its most basic form, machine translation parses a source document in one language replacing each word of the source language with a corresponding translation of the word in a target language. Of course, the resultant translate document will seldom reflect a proper translation given the nuances of one language over the other. As such, more advanced forms of machine translation utilize statistical analysis to best determine a context of parsed text to produce a more accurate translation.

Given that the differences between different languages can be substantial, machine translation oftentimes is supplemented with a crowd-sourced manual effort in which different members of the public all speaking the same language pair are tasked with the translation of different portions of a common document such that the resultant translation of each portion can be re-assembled into a translated document. While each member participating in a crowd-sourced translation may utilize machine translation, ultimately each member participating in the crowd-sourced translation may also manually refine the resultant translated text from machine translation to ensure its integrity as a proper translation of the source text. Of course, crowd-sourcing the translation of a document requires at the outset knowledge of the identity of a sufficient number of speakers of the source and target language so as to effectively apportion translation assignments to the participants.

BRIEF SUMMARY OF THE INVENTION

Embodiments of the present invention address deficiencies of the art in respect to crowd-sourced translation of a document and provide a novel and non-obvious method, system and computer program product for social network crowd translation. In an embodiment of the invention, a method for social network crowd translation includes selecting a source document to be translated into a specific target language from a source language and parsing the document to determine a context for the source document. The method also includes querying a social network for different individuals with profile data indicating proficiency with the target language and including keywords mapping to the context of the document. Finally, in response to locating an individual in the social network having profile data which indicates proficiency with the target language and including keywords mapping to the context of the document, the located individual is notified of a request to translate the document.

In one aspect of the embodiment, individual portions of the source document are selected and a translation request transmitted to the located individual along with at least one of the individual portions. In another aspect of the embodiment, the context can be determined based upon a frequency of word usage in the source document. Also, the context can be determined based upon one or more tags applied to the source document. Finally, the context can be determined based upon a published profile of a source of the source document or based upon a comparison of skills of existing translators for the source document.

In another embodiment of the invention, a translation data processing system is configured for social network crowd translation. The system includes a host computing system that includes one or more computers, each with memory and at least one processor, the host computing system being coupled to one or more social networking services over a computer communications network. The system also includes a data store coupled to the host computing system and storing a source document with text of a source language. Finally, the system includes a social network crowd translation module executing in the host computing system.

The module includes program code enabled upon execution in the memory of the host computing system to select a source document to be translated into a specific target language from a source language and to parse the document to determine a context for the source document. The program code additionally is enabled to query a social network for different individuals with profile data indicating proficiency with the target language and including keywords mapping to the context of the document. Finally, the program code is enabled to respond to locating an individual in the social network having profile data which indicates proficiency with the target language and including keywords mapping to the context of the document, by directing notification of the located individual of a request to translate the document.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for social network crowd translation. In accordance with an embodiment of the invention, a source document is selected for translation from a source language into a target language. Thereafter, a context is determined for the source document and one or more social networks are queried to identify a set of social network members proficient in translating text from the source language to the target language. The social networks additionally are queried to identify a set of social network members with profile data that not only indicates a proficiency with the target language, but also that includes keywords mapping to the context of the document. Finally, in response to locating an individual in the social network having profile data which indicates proficiency with the target language and that includes keywords mapping to the context of the document, the located individual is notified of a request to translate the document.

Figure 1:
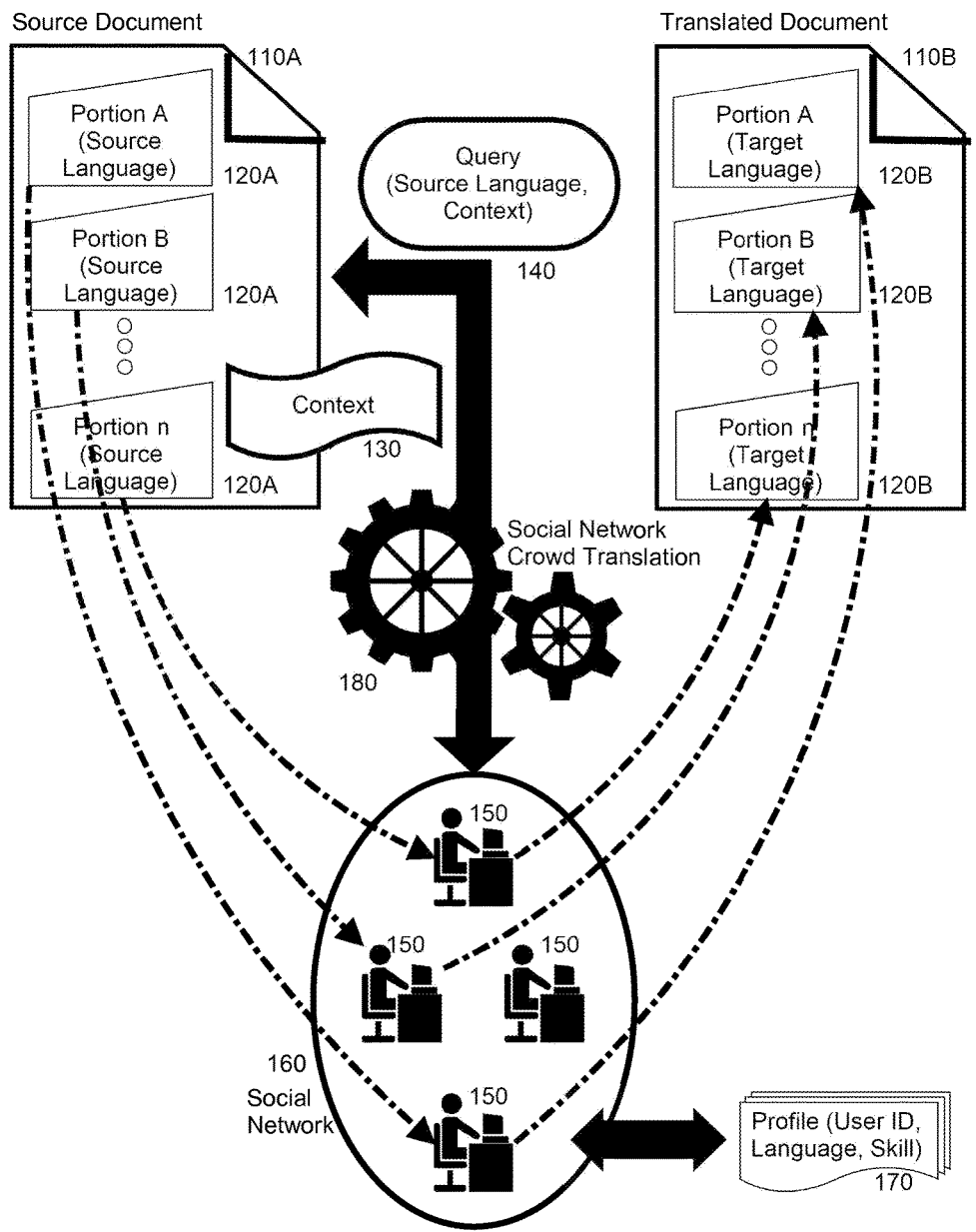
FIG. 1 is a pictorial illustration of a process for social network crowd translation.

In further illustration, FIG. 1 is a pictorial illustration of a process for social network crowd translation. As shown in FIG. 1, a source document 110A can be provided that includes different portions 120A of content of a particular spoken source language, such as the English language. A context 130 further can be determined for the source document 110A, for instance a topic of the source document, or a particular subject referenced by one or more of the portions 120A of the source document 110A, or based upon a comparison of skills of existing translators for the source document.

Thereafter, social network crowd translation logic 180 can send a query 140 to a social network 160 of different end users 150 to identify within the profiles 170 of the end users 150, a set of the end users 150 proficient in a target language specified for the source document 110. As well, the query 140 can specify that the set of the end users 150 include an expertise consistent with the context 130.

Thereafter, the different ones of the end users 150 in the identified set can be notified of a request to translate one or more of the portions 120A. Optionally, different ones of the portions 120A can be assigned to different ones of the end users 150 in the identified set and the portions 120A can be transmitted to respective ones of the assigned end users 150. The assigned end users 150 can be perform manual or machine assisted translation upon the respective portions 120A in respect to the selected target language in order to produce translated portions 120B. Thereafter, the social crowd translation logic 180 can assemble the translated portions 120 into a translated document 110B.

Figure 2:
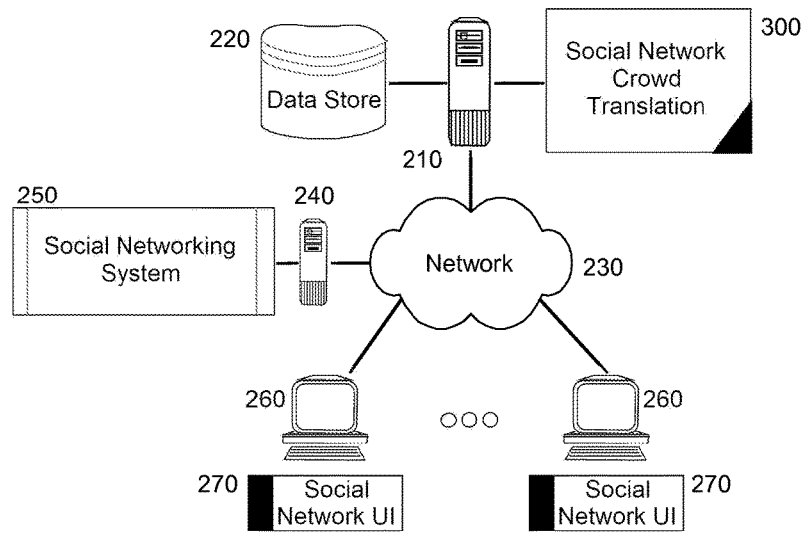
FIG. 2 is a schematic illustration of a translation data processing system configured for social network crowd translation; and, FIG. 3 is a flow chart illustrating a process for social network crowd translation.

The process described in connection with FIG. 1 can be implemented within a translation data processing system. In further illustration, FIG. 2 schematically shows a translation data processing system configured for social network crowd translation. The system includes a host computing system 210 that includes one or more computers, each with memory and at least one processor. The host computing system 210 can be coupled by way of a computer communications network 230 to a social networking system 250 executing in memory of another host computing system 240. The social networking system 250 in turn can be accessed by different end users through a corresponding user interface 270 to the social networking system 250 presented in respectively different client computers 260.

Of note, a social network crowd translation module 300 can be hosted within the host computing system 210. The social network crowd translation module 300 can include program code that when executes in the memory of the host computing system 210, is enabled to load from data store 220, a source document of one spoken language for translation to a target spoken language. The program code additionally is enabled to identify a context for the source document and to issue a query to the social networking system 250 over the network 230 for a set of end users proficient in the target language and also associated with the context. The program code further is enabled to notify each end user in the set of a request to translate the document. Optionally, the program code is enabled to partition the source document into different portions and to transmit to each end user in the set, one or more of the different portions for translation into the target language. Finally, the program code is enabled to receive from the end users in the set, resultant translated portions of the source document for assembly into a target document for storage in the data store 220.

Figure 3:
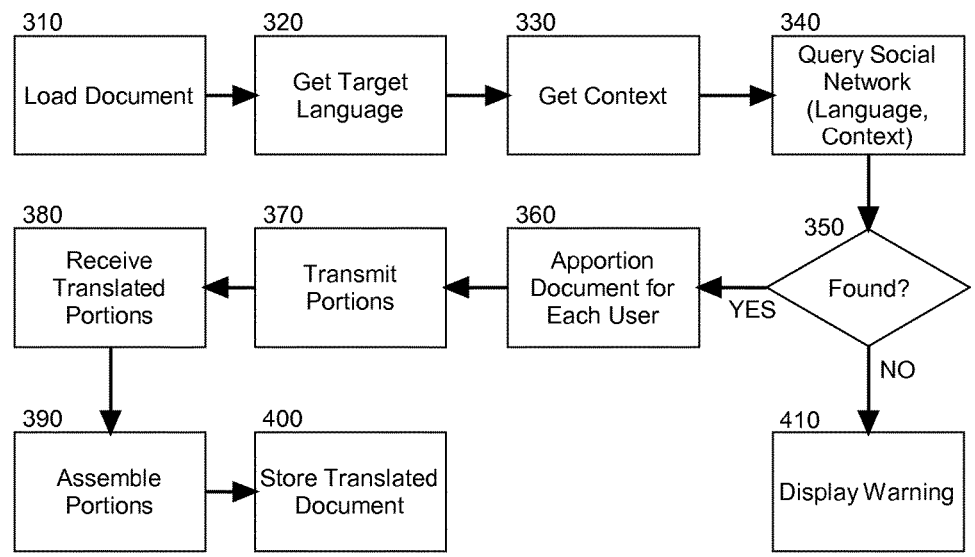

In even yet further illustration of the operation of the social network crowd translation module 300, FIG. 3 is a flow chart illustrating a process for social network crowd translation. Beginning in block 310, a source document can be loaded and in block 320, a target language can be selected for translating the source document into a translated, target document. In this regard, the target language can be selected, or logically determined, for instance based upon a geographic location in which the source document is most often retrieved. In block 330, a context also can be determined for the source document, for instance by parsing the content of the source document and identifying in the parsed content, one or more keyword, or by parsing tags for the source document to identify one or more keywords, or by inspecting a tag cloud for the source document.

Thereafter, a query can be formed including the target language and the context and in block 340, the query can be provided to the social networking system. In decision block 350, it can be determined whether or not any end users of the social networking system are both proficient in the target language and also familiar with the determined context. If not, in block 410 a warning can be displayed that crowd translation is not available. Otherwise, the process can continue in block 360. In block 360, the source document can be apportioned into different portions with each portion being assigned to one of the end users identified in consequence of the query. In block 370, the portions can then be transmitted to respectively assigned ones of the end users of the social networking system. Subsequently, in block 380 translated ones of the portions of the source document can be received from the end users in the set and in block 390, the received translated portions can be assembled into a target document. Finally, in block 400 the assembled document can be stored as a translation of the source document.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for sourcing document translation comprising:
    selecting a source document to be translated into a specific target language from a source language;
    parsing the selected source document to determine a context for the selected source document;
    transmitting over a computer communications network a query to a social network for different individuals with profile data indicating proficiency with the target language and including keywords mapping to the context of the selected source document;
    receiving from over the computer communications network in response to the transmitted query, profile data for a multiplicity of individuals in the social network each having profile data which indicates a proficiency with the target language, the profile data including keywords mapping to the context of the selected source document;
    apportioning the selected source document into different portions and transmitting each of the different portions to a different one of the multiplicity of individuals for translation and receiving from each of the multiplicity of individuals a translated form of a corresponding one of the different portions;
    assembling the translated form of each of the different portions into a translated document; and,
    storing the translated document.

2. The method of claim 1, wherein the context is determined based upon a frequency of word usage in the selected source document.

3. The method of claim 1, wherein the context is determined based upon one or more tags applied to the selected source document.

4. The method of claim 1, wherein the context is determined based upon a published profile of a source of the selected source document.

5. The method of claim 1, wherein the context is determined based upon a comparison of skills of existing translators for the selected source document.

6. A translation data processing system configured for social network crowd translation, the system comprising:
    a host computing system comprising one or more computers, each with memory and at least one processor, the host computing system being coupled to one or more social networking services over a computer communications network;
    a data store coupled to the host computing system and storing a source document with text of a source language; and,
    a social network crowd translation module executing in the host computing system, the module comprising program code enabled upon execution in the memory of the host computing system to select a source document to be translated into a specific target language from a source language, to parse the selected source document to determine a context for the selected source document, to transmit over the computer communications network a query to a social network for different individuals with profile data indicating proficiency with the target language and including keywords mapping to the context of the selected source document, to receive from over the computer communications network in response to the transmitted query, profile data for a multiplicity of individuals in the social network each having profile data which indicates a proficiency with the target language, the profile data including keywords mapping to the context of the selected source document, to apportion the selected source document into different portions and transmitting each of the different portions to a different one of the multiplicity of individuals for translation and receive from each of the multiplicity of individuals a translated form of a corresponding one of the different portions, to assemble the translated form of each of the different portions into a translated document, and to store the translated document.

7. The system of claim 6, wherein the context is determined based upon a frequency of word usage in the selected source document.

8. The system of claim 6, wherein the context is determined based upon one or more tags applied to the selected source document.

9. The system of claim 6, wherein the context is determined based upon a published profile of a source of the selected source document.

10. The system of claim 6, wherein the context is determined based upon a comparison of skills of existing translators for the selected source document.

11. A computer program product for social network crowd translation, the computer program product comprising a non-transitory computer readable storage medium having program instructions embodied therewith, the program instructions executable by a device to cause the device to perform a method comprising:
    selecting a source document to be translated into a specific target language from a source language;
    parsing the selected source document to determine a context for the selected source document;
    transmitting over a computer communications network a query to a social network for different individuals with profile data indicating proficiency with the target language and including keywords mapping to the context of the selected source document;
    receiving from over the computer communications network in response to the transmitted query, profile data for a multiplicity of individuals in the social network each having profile data which indicates a proficiency with the target language, the profile data including keywords mapping to the context of the selected source document;
    apportioning the selected source document into different portions and transmitting each of the different portions to a different one of the multiplicity of individuals for translation and receiving from each of the multiplicity of individuals a translated form of a corresponding one of the different portions;

assembling the translated form of each of the different portions into a translated document; and, storing the translated document.

12. The computer program product of claim 11, wherein the context is determined based upon a frequency of word usage in the selected source document.

13. The computer program product of claim 11, wherein the context is determined based upon one or more tags applied to the selected source document.

14. The computer program product of claim 11, wherein the context is determined based upon a published profile of a source of the selected source document.

15. The computer program product of claim 11, wherein the context is determined based upon a comparison of skills of existing translators for the selected source document.

\* \* \* \* \*